(12) United States Patent
Lu et al.

(10) Patent No.: US 9,045,361 B2
(45) Date of Patent: *Jun. 2, 2015

(54) COATED ARTICLE WITH HEAT TREATABLE COATING FOR CONCENTRATED SOLAR POWER APPLICATIONS, AND/OR METHODS OF MAKING THE SAME

(71) Applicant: Guardian Industries Corp., Auburn Hills, MI (US)

(72) Inventors: Yiwei Lu, Ann Arbor, MI (US); Philip J. Lingle, Temperance, MI (US); David P. Maikowski, Plymouth, MI (US); Daniel F. Prone, Trenton, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/200,089

(22) Filed: Mar. 7, 2014

(65) Prior Publication Data

US 2014/0202210 A1 Jul. 24, 2014

Related U.S. Application Data

(63) Continuation of application No. 12/929,374, filed on Jan. 19, 2011, now Pat. No. 8,702,253.

(60) Provisional application No. 61/282,307, filed on Jan. 19, 2010.

(51) Int. Cl.
*G02B 7/182* (2006.01)
*G02B 5/08* (2006.01)
*C03B 23/025* (2006.01)
(Continued)

(52) U.S. Cl.
CPC ............. *C03B 23/025* (2013.01); *F24J 2/1057*
(2013.01); *F24J 2/18* (2013.01); *G02B 5/0858*
(2013.01); *Y02E 10/40* (2013.01); *C03C 17/3639* (2013.01); *C23C 28/30* (2013.01); *C03C 17/361* (2013.01);
(Continued)

(58) Field of Classification Search
None
See application file for complete search history.

(56) References Cited

U.S. PATENT DOCUMENTS 4,056,313 A 11/1977 Arbogast
4,059,094 A 11/1977 Barrio de Mendoza
(Continued)

FOREIGN PATENT DOCUMENTS

DE 36 26 780 2/1988
EP 1 113 295 2/2005
(Continued)

OTHER PUBLICATIONS

International Search Report dated Apr. 1, 2011.

*Primary Examiner* — Jade R Chwasz
(74) *Attorney, Agent, or Firm* — Nixon & Vanderhye P.C.

(57) ABSTRACT

Certain example embodiments relate to heat treatable coated articles, e.g., suitable for concentrating solar power (CSP) and/or other applications. For instance, the heat treatable coated article may be a secondary reflector panel, primary reflector, etc., where a reflective coating is disposed on a glass substrate. A portion of the reflective coating may be removed and a frit material is disposed over the reflective coating. An elevated temperature may be applied to the glass substrate, the coating, and the frit material where the frit is cured. The coated article may be left flat, or optionally cold- or hot-bent into a desired shape suitable for a desired application.

3 Claims, 9 Drawing Sheets

(51) Int. Cl.
*F24J 2/10* (2006.01)
*F24J 2/18* (2006.01)
*C03C 17/36* (2006.01)
*C23C 28/00* (2006.01)

(52) U.S. Cl.
CPC ......... *C03C 17/3618* (2013.01); *C03C 17/3644* (2013.01); *C03C 17/3663* (2013.01)

(56) References Cited

U.S. PATENT DOCUMENTS

| | | | |
|---|---|---|---|
| 4,117,682 | A | 10/1978 | Smith |
| 4,161,942 | A | 7/1979 | Monk |
| 4,237,864 | A | 12/1980 | Kravitz |
| 4,572,160 | A | 2/1986 | Blikken et al. |
| 4,608,964 | A | 9/1986 | Russo |
| 5,030,594 | A | 7/1991 | Heithoff |
| 5,195,503 | A | 3/1993 | Ludlow |
| 5,275,149 | A | 1/1994 | Ludlow |
| 5,347,402 | A | 9/1994 | Arbogast |
| 6,050,526 | A | 4/2000 | Stribling, Jr. |
| 7,557,053 | B2 | 7/2009 | Thomsen et al. |
| 7,700,869 | B2 | 4/2010 | Thomsen et al. |
| 7,700,870 | B2 | 4/2010 | Thomsen et al. |
| 7,871,664 | B2 | 1/2011 | O'Connor et al. |
| 8,702,253 | B2 | 4/2014 | Lu et al. |
| 2005/0018330 | A1 | 1/2005 | Sakoo et al. |
| 2007/0000285 | A1 | 1/2007 | Vandal |
| 2007/0176551 | A1 | 8/2007 | Kwak |
| 2007/0215205 | A1 | 9/2007 | Thomsen et al. |
| 2007/0221313 | A1 | 9/2007 | Franck et al. |
| 2007/0223096 | A1 | 9/2007 | O'Connor et al. |
| 2007/0223121 | A1 | 9/2007 | Franck et al. |
| 2007/0291384 | A1 | 12/2007 | Wang |
| 2009/0101208 | A1 | 4/2009 | Vandal et al. |
| 2009/0217978 | A1 | 9/2009 | Thomsen et al. |
| 2009/0223252 | A1 | 9/2009 | Fulton et al. |
| 2010/0122728 | A1 | 5/2010 | Fulton et al. |
| 2010/0255980 | A1 | 10/2010 | Fulton et al. |
| 2011/0176212 | A1 | 7/2011 | Lu et al. |

FOREIGN PATENT DOCUMENTS

| | | |
|---|---|---|
| EP | 1 918 740 | 5/2008 |
| KR | 2009 0132794 | 12/2009 |

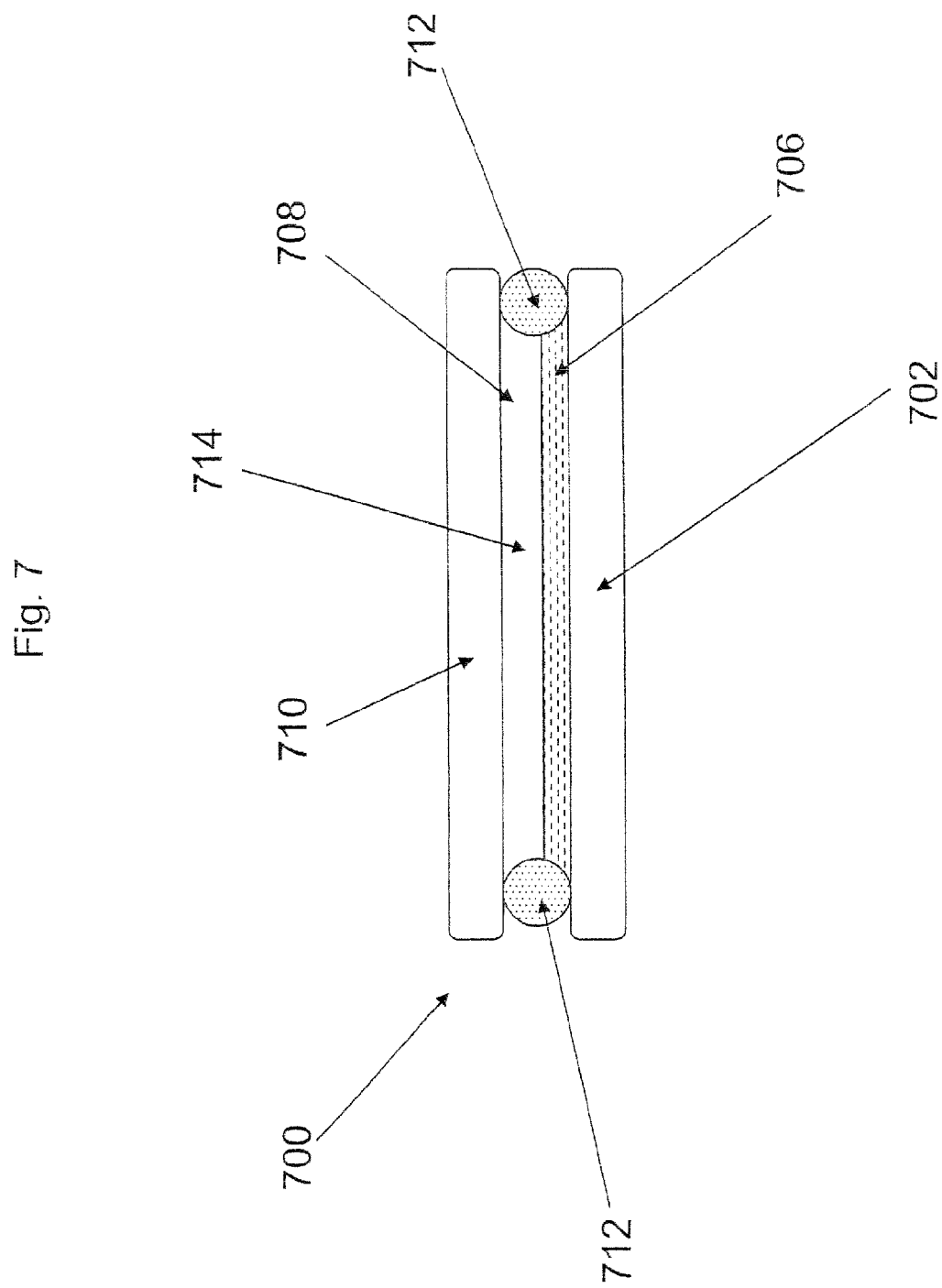

COATED ARTICLE WITH HEAT TREATABLE COATING FOR CONCENTRATED SOLAR POWER APPLICATIONS, AND/OR METHODS OF MAKING THE SAME

This application is a continuation of application Ser. No. 12/929,374, filed Jan. 19, 2011, which claims benefit of Provisional Application Ser. No. 61/282,307, filed Jan. 19, 2010, the entire disclosures of which are hereby incorporated herein by reference in this application. This application is also related to U.S. application Ser. No. 12/929,087, the entire contents of which are hereby incorporated herein by reference.

FIELD OF THE INVENTION

Certain example embodiments of this invention relate to coated articles with heat treatable coatings for concentrated solar power (CSP) applications, and/or methods of making the same. More particularly, certain example embodiments of this invention relate to making a reflector panel with a reflective coating and a frit material backing by curing the frit material, bending the substrate, and heat treating the substrate with the coating thereon during a common heating process. In other words, in certain example embodiments, the substrate is bent and the frit material is cured, while the substrate with the coating and frit material thereon is being heat treated. The coated articles described herein may be used in connection with secondary reflector panel (SRP) applications, as primary reflectors, and/or in any other mirror-related application

BACKGROUND AND SUMMARY OF EXAMPLE EMBODIMENTS OF THE INVENTION

Solar collectors are known in the art. Example solar collectors are disclosed in U.S. Pat. Nos. 6,050,526, 5,347,402, 4,572,160, 4,056,313, 4,117,682, 4,608,964, 4,059,094, 4,161,942, 5,275,149, 5,195,503 and 4,237,864, the disclosures of which are hereby incorporated herein by reference. See also U.S. Publication Nos. 2007/0223096 and 2009/0101208, which are also incorporated herein by reference.

A component in a Fresnel mirror concentrated solar power generating plant is a secondary reflector mirror assembly. The mirror in the secondary assembly, called the secondary reflector panel (or SRP) is bent or formed, typically from an aluminum sheet. Conventional SRPs, when installed as part of the secondary reflector assembly, often experience problems (e.g., do not function or are otherwise limited) when a maximum operating temperature of about 270 degrees C. is met or exceeded. For instance, as temperatures generated by the panel exceed 270 degrees C., the formed aluminum panel becomes altered in its physical material characteristics. These changes degrade the solar reflective performance of the aluminum surface and prevent the generated temperatures from exceeding about 270 degrees C. in the SRP assembly unit.

In a CSP plant, a secondary reflector panel typically helps heat an absorber tube that is filled with water or other heating fluid. The water is converted into steam with a temperature of about 270 degrees C. and a pressure of 55 bar. The steam is used to drive a turbine-generator unit, thereby producing electrical power. The overall efficiency of the Fresnel reflector solar power generating system thus is tied to the temperature and pressure of the produced steam. Increasing the solar reflectance generated by the secondary mirror panel and increasing the operating temperature of the panel increases the energy input to the steam. This directly increases the power and thermal efficiency of the Fresnel power plant. This efficiency limitation is a driver for the competitiveness of this technology versus other solar thermal technologies such as parabolic trough and central receivers.

Thus, it will be appreciated that there exists a need in the art for improved secondary reflector panel and/or the like. It also will be appreciated that coated articles used in connection with parabolic (e.g., parabolic trough) or flat reflector applications, as well as any other mirror application, would benefit from the ability to have heat treatable thin-film mirror coatings disposed thereon, with such articles being cold-bendable and/or bendable under heated conditions.

In certain example embodiments, there is provided a method of making a heat treatable coated article. A reflective multi-layer coating is disposed on a major surface of a glass substrate. A portion of the reflective multi-layer coating proximate to edges of the glass substrate is removed. A frit material is disposed over the glass substrate including both the edges thereof and over the reflective multi-layer coating disposed on the glass substrate. The glass substrate, as well as the reflective multi-layer and the frit material disposed on the glass substrate, are heated to an elevated temperature so as to cure the frit material. The coated article may be left flat, or optionally hot or cold bent to a desired shape (e.g., a shape suitable for a parabolic reflector, parabolic trough, etc.). For instance, in certain example instances, the glass substrate with the reflective multi-layer coating and the frit material disposed thereon may be bent during said heating, e.g., in a hot-bending process. The coated article may be used in mirror/reflector applications, e.g., as a primary reflector, a secondary reflector panel, etc.

In certain example embodiments, there is provided a method of making a heat treatable coated article. A silver-inclusive reflective coating is disposed on a major surface of a glass substrate. A frit material is disposed over at least a portion of the reflective multi-layer coating. The substrate, with the reflective coating and the frit material thereon, is heated to a first elevated temperature to dry the frit material and remove at least some of solvent from the frit material. The substrate, with the reflective coating and the frit material thereon, is bent while a second elevated temperature is applied thereto. The frit material is cured during application of the second elevated temperature, and the second elevated temperature is higher than the first elevated temperature. Following application of the second elevated temperature, the reflective coating is substantially hermetically sealed between the frit material and the glass substrate.

In certain example embodiments, a heat treatable coated article is provided. A low-iron glass substrate has a thickness of about 1.6-3.0 mm. A multi-layer reflective coating is disposed on the low-iron glass substrate, with the multi-layer reflective coating including at least one layer of silver sandwiched by first and second layers including Ni and/or Cr. A ceramic frit material is bonded to at least a portion of the multi-layer reflective coating and further bonded to at least a peripheral portion of the glass substrate where the multi-layer reflective coating is not disposed. The ceramic frit material at least initially includes a non-water carrier system. The heat treatable coated article has a total solar reflectance of at least 93%.

These features, aspects, and advantages may be used in any suitable combination or sub-combination in different embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 7 is a third example cross-sectional view of a reflector according to certain example embodiments.

DETAILED DESCRIPTION OF EXAMPLE EMBODIMENTS OF THE INVENTION

The following description is provided in relation to several example embodiments which may share common characteristics, features, etc. It is to be understood that one or more features of any one embodiment may be combinable with one or more features of other embodiments. In addition, single features or a combination of features may constitute an additional embodiment(s).

Certain exemplary embodiments relate to an improved (e.g., high performance) secondary reflector panel (SRP) that may be used in concentrating solar power applications (CSP applications), such as, for example, Fresnel CSP designs. The coated product includes a high performance secondary reflector mirror) that may be bent after coating to the desired reflector shape. Alternatively, or in addition, the product may be optionally fritted, painted, or laminated to protect the mirrored surface. The secondary mirror may include a sputtered silver-inclusive or silver-based coating onto a glass substrate. Solar float glass commercially available from the assignee of the instant application under the trade name Eco-Guard may be used in connection with certain example embodiments. In certain example embodiments, such glass may survive bending temperatures in excess of 650 degrees C. and stresses brought about by bending to a radius of less than about 12 inches (30 cm) and a mirror disposed thereon may have a total solar reflectance of greater than 93%. The second surface mirror may be disposed onto low iron glass in a thickness range of 1.6-3.0 mm, for example. In certain examples, the post-fabricated mirror may survive extended exposure to temperatures in the range of 250-450 degree C., as well as daily cyclic exposure between about 0 degrees C. and 450 degrees C. The same or similar techniques may be used in connection with flat or bent (e.g., cold-bent or hot-bent) mirror applications, e.g., for primary reflectors in concentrating solar power or other mirror-inclusive applications, so as to provide at least heat treatable coated article that is survivable in potentially harsh environments.

Figure 1:
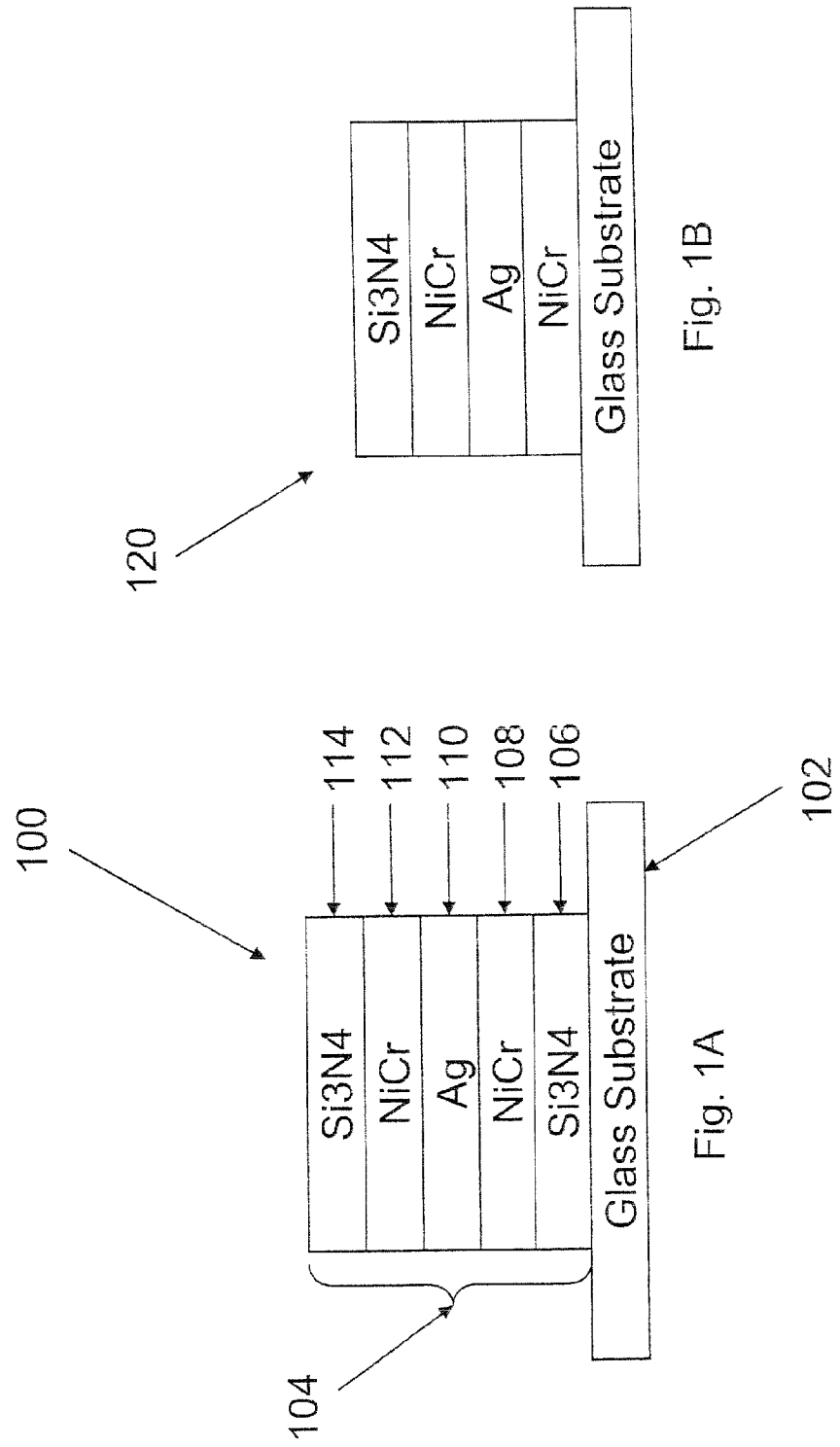
FIGS. 1A and 1B are example layer stacks that may be disposed on a substrate according to certain example embodiments.

FIG. 1A is an example layer stack disposed on a substrate according to certain example embodiments. A mirror 100 may include a glass substrate 102 of which disposed thereon may be a layer stack 104. Glass substrate 102 may be composed of a lower iron and/or high solar transmission float glass. In certain example embodiments, the glass substrate may be designed to increase solar reflectivity of the finished mirror product.

Various techniques for producing low iron glass are available. See, for example, U.S. Pat. Nos. 7,700,870; 7,700,869; 7,557,053; and 5,030,594 and U.S. Publication Nos. 2007/0215205; 2009/0223252; 2010/0122728; 2010/0255980; and 2009/0217978, the entire contents of each of which are hereby incorporated herein by reference.

An exemplary soda-lime-silica base glass according to certain embodiments, on a weight percentage basis, includes the following basic ingredients:

TABLE 1

Example Base Glass

| Ingredient | Weight % |
|---|---|
| $SiO_2$ | 67-75% |
| $Na_2O$ | 10-20% |
| CaO | 5-15% |
| MgO | 0-7% |
| $Al_2O_3$ | 0-5% |
| $K_2O$ | 0-5% |

Other minor ingredients, including various conventional refining aids, such as $SO_3$, carbon, and the like may also be included in the base glass. In certain embodiments, for example, the glass herein may be made from batch raw materials silica sand, soda ash, dolomite, limestone, with the use of sulfate salts such as salt cake ($Na_2SO_4$) and/or Epsom salt ($MgSO_4 \times 7H_2O$) and/or gypsum (e.g., about a 1:1 combination of any) as refining agents. In certain example embodiments, soda-lime-silica based glasses herein include by weight from about 10-15% $Na_2O$ and from about 6-12% CaO.

In addition to the base glass (e.g., see Table 1 above), in making glass according to certain example embodiments of the instant invention the glass batch includes materials (including colorants and/or oxidizers) which cause the resulting glass to be fairly neutral in color (slightly yellow in certain example embodiments, indicated by a positive b* value) and/or have a high visible light transmission. These materials may either be present in the raw materials (e.g., small amounts of iron), or may be added to the base glass materials in the batch (e.g., antimony and/or the like). In certain example embodiments of this invention, the resulting glass has visible transmission of at least 75%, more preferably at least 80%, even more preferably of at least 85%, and most preferably of at least about 90% (sometimes at least 91%) (Lt D65).

In certain embodiments, in addition to the base glass, the glass and/or glass batch comprises or consists essentially of materials as set forth in Table 2 below (in terms of weight percentage of the total glass composition):

TABLE 2

Example Additional Materials In Glass

| Ingredient | General (Wt. %) | More Preferred | Most Preferred |
|---|---|---|---|
| Total Iron (expressed as $Fe_2O_3$) | 0.001-0.06% | 0.005-0.045% | 0.01-0.03% |
| % FeO | 0-0.0040% | 0-0.0030% | .001-0.0025% |
| Glass Redox (FeO/total iron) | <=0.10 | <=0.06 | <=0.04 |
| Cerium Oxide | 0-0.07% | 0-0.04% | 0-0.02% |
| Antimony Oxide | 0.01-1.0% | 0.01-0.5% | 0.1-0.3% |
| $SO_3$ | 0.1-1.0% | 0.2-0.6% | 0.25-0.5% |
| $TiO_2$ | 0-1.0% | 0.005-0.4% | 0.01-0.04% |

In certain example embodiments, the antimony may be added to the glass batch in the form of one or more of $Sb_2O_3$ and/or $NaSbO_3$. Note also $Sb(Sb_2O_5)$. The use of the term antimony oxide herein means antimony in any possible oxidation state, and is not intended to be limiting to any particular stoichiometry.

The low glass redox evidences the highly oxidized nature of the glass. Due to the antimony (Sb), the glass is oxidized to a very low ferrous content (% FeO) by combinational oxidation with antimony in the form of antimony trioxide ($Sb_2O_3$), sodium antimonite ($NaSbO_3$), sodium pyroantimonate (Sb ($Sb_2O_5$)), sodium or potassium nitrate and/or sodium sulfate. In certain example embodiments, the composition of the glass substrate 102 includes at least twice as much antimony oxide as total iron oxide, by weight, more preferably at least about three times as much, and most preferably at least about four times as much antimony oxide as total iron oxide.

In certain example embodiments the colorant portion is substantially free of other colorants (other than potentially trace amounts). However, it should be appreciated that amounts of other materials (e.g., refining aids, melting aids, colorants and/or impurities) may be present in the glass in certain other embodiments of this invention without taking away from the purpose(s) and/or goal(s) of the instant invention. For instance, in certain example embodiments, the glass composition is substantially free of, or free of, one, two, three, four or all of: erbium oxide, nickel oxide, cobalt oxide, neodymium oxide, chromium oxide, and selenium. The phrase "substantially free" means no more than 2 ppm and possibly as low as 0 ppm of the element or material.

The total amount of iron present in the glass batch and in the resulting glass, i.e., in the colorant portion thereof, is expressed herein in terms of $Fe_2O_3$ in accordance with standard practice. This, however, does not imply that all iron is actually in the form of $Fe_2O_3$ (see discussion above in this regard). Likewise, the amount of iron in the ferrous state ($Fe^{2+}$) is reported herein as FeO, even though all ferrous state iron in the glass batch or glass may not be in the form of FeO. As mentioned above, iron in the ferrous state ($Fe^{2+}$; FeO) is a blue-green colorant, while iron in the ferric state ($Fe^{3+}$) is a yellow-green colorant; and the blue-green colorant of ferrous iron is of particular concern, since as a strong colorant it introduces significant color into the glass which can sometimes be undesirable when seeking to achieve a neutral or clear color.

In view of the above, glasses according to certain example embodiments achieve a neutral or substantially clear color and/or high visible transmission. In certain embodiments, resulting glasses according to certain example embodiments of this invention may be characterized by one or more of the following transmissive optical or color characteristics when measured at a thickness of from about 1-6 mm (most preferably a thickness of about 3-4 mm; this is a non-limiting thickness used for purposes of reference only) (Lta is visible transmission %). It is noted that in the table below the a* and b* color values are determined per Ill. D65, 10 degree Obs.

TABLE 3

Glass Characteristics of Example Embodiments

| Characteristic | General | More Preferred | Most Preferred |
| --- | --- | --- | --- |
| Lta (Lt D65): | >=85% | >=90% | >=91% |
| % τe (ISO 9050): | >=85% | >=90% | >=91% |
| % FeO (wt. %): | <=0.004% | =0.003% | <=0.0020% |
| L* (Ill. D65, 10 deg.): | 90-99 | n/a | n/a |

TABLE 3-continued

Glass Characteristics of Example Embodiments

| Characteristic | General | More Preferred | Most Preferred |
| --- | --- | --- | --- |
| a* (Ill. D65, 10 deg.): | −1.0 to +1.0 | −0.5 to +0.5 | −0.2 to 0.0 |
| b* (Ill. D65, 10 deg.): | 0 to +1.5 | +0.1 to +1.0 | +0.2 to +0.7 |

Mirror 100 may include a silicon inclusive (e.g., a silicon nitride layer such as $Si_3N_4$ or other suitable stoichiometry) undercoat layer 106 in contact with the glass substrate 102 that is less than about 50 A. In certain example embodiments, the $Si_3N_4$ undercoat layer 106 disposed nearest the glass substrate 102 may provide improved chemical, environmental, and mechanical durability of the stack 104 compared a layer stack which does not employ a $Si_3N_4$ undercoat (e.g., as a layer closest to the glass substrate). The $Si_3N_4$ undercoat layer 106 may reduce the amount of sodium migrating through the coating when the layer stack is heat-treated. In certain example embodiments, this reduction may be substantial. Accordingly, in certain example embodiments, the use of Si3N4 may improve the optical properties (n and k) of an overlying Ag layer.

According to certain example embodiments, a thickness of the $Si_3N_4$ undercoat layer 106 of less than about 50 A may further reduce the loss of solar reflectance of the overall layer stack 104 while maintaining the above mentioned durability advantages. Further, according to certain example embodiments, having a thinner $Si_3N_4$ undercoat layer 106 may reduce the total stress in the layer stack 104. This may in turn help reduce glass distortion during the heat-treating (e.g., bending) process of the glass substrate and the layer stack.

A thin nickel-chrome (for example, NiCr 80/20) layer 108 may be disposed on the $Si_3N_4$ undercoat layer. In certain example embodiments layer 108 may be about 10 A. The layer 108 may help to facilitate the adherence of the overlying silver (Ag) layer 110 to the $Si_3N_4$ undercoat layer 106 in certain as-coated examples and additionally throughout the heat-treatment process. In certain example embodiments, a NiCr undercoat thickness of about 10 A may reduce the loss of solar reflectance of the overall layer stack 104 while maintaining adhesion between the $Si_3N_4$ undercoat layer 106 and high reflectance Ag layer 110.

Next, a silver (Ag) layer 110 may be disposed after the NiCr undercoat layer. In certain example embodiments, silver layer 110 can vary from about 600 A to about 750 A in thickness. The silver in the layer 110 may be responsible for the very high reflectance in the visible and near infrared portions of the solar spectrum. At the thickness levels indicated above, transmission may be reduced to about 1% over the visible and near infrared portion of the solar spectrum.

A NiCr overcoat layer 112 may be disposed after the Ag layer. The thickness of this NiCr layer 112 may vary from about 100 A to about 350 A in different example embodiments. The overcoat NiCr layer 112 may reduce the solar transmission to nearly 0%, increase solar reflectivity, and may also help adhere the Ag layer 110 to the protective $Si_3N_4$ overcoat layer 114.

A protective silicon-inclusive layer (e.g., a $Si_3N_4$ or other suitable stoichiometry layer) overcoat layer 114 may be provided as the top or final layer of the layer stack 104. The $Si_3N_4$ overcoat layer 114 may have a thickness of about 150 A and may vary from about 100 A to 200 A in certain example embodiments. The protective $Si_3N_4$ overcoat layer may provide mechanical, chemical, and/or environmental durability to the coating system. Layer 114 may also provide more thermal stability when the glass substrate 102 and the layer stack 104 are exposed to temperatures and times commonly used to bend glass (e.g., about 625 degrees C. or greater for about 30 minutes or more).

FIG. 1B shows another layer stack according to certain example embodiments. In this example design, the layer stack disposed onto a glass substrate is the same or similar to that shown in FIG. 1A. However, unlike the embodiment shown in FIG. 1A, the $Si_3N_4$ undercoat layer is removed. Accordingly, the maximum solar reflectance in this embodiment may be slightly greater than the embodiment shown in FIG. 1A. It will be appreciated that in certain example embodiments such a stack may be used where maximum chemical, mechanical, and/or environmental durability may be less of a concern.

A summary of optics and solar performance according to certain example embodiments is shown below for as-coated and post heat treatment embodiments.

TABLE 1

Monolithic As-Coated Performance Matrix and Sample Data Compliance

| Mirror Coating: As-Coated | Preferred | Low Range | Upper Range | Lower Limit | Upper Limit | Example |
|---|---|---|---|---|---|---|
| Glass Thickness SCI | 2 | −0.1 | 0.1 | 1.9 | 2.1 | 2 |
| TY (C/2) | 0.3 | −0.3 | .2 | 0 | .5 | .32 |
| L* (C/2) | 2.71 | −2.71 | 1.81 | 0 | 4.52 | 2.92 |
| a* (C/2) | 1 | −1 | 1 | 0 | 2 | .99 |
| b* (C/2) | −5 | −1 | 1 | −6 | −4 | −5.56 |
| RgY (C/2) | 87 | 0 | 13 | 87 | 100 | 87.51 |
| L* (C/2) | 94.74 | 0 | 5.26 | 94.74 | 100 | 94.95 |
| a* (C/2) | 0 | −1 | 1 | −1 | 1 | −.49 |
| b* (C/2) | 3 | −1 | 1 | 2 | 4 | 3.25 |
| RfY (C/2) | 50 | −25 | 25 | 25 | 75 | 39.43 |
| L* (C/2) | 76.07 | −18.99 | 13.32 | 57.08 | 89.39 | 69.06 |
| a* (C/2) | 0 | −6 | 6 | −6 | 6 | .45 |
| b* (C/2) | 20 | −20 | 20 | 0 | 40 | 28.03 |
| Sheet resistance | .4 | −.1 | .1 | .3 | .5 | .38 |
| Rg-Vis (555 nm) | >90 | | | 90 | 100 | 90.77 |
| RG-NIR (950 nm) | >90 | | | 90 | 100 | 91.35 |
| Brush (As-coated and Post-HT) | ≤1 at 300 strokes | | | | 1 | 1 |
| 3M Tape Delamination test | None | | | | | None |

TABLE 2

Monolithic Post-HT Performance Matrix and Sample Data Compliance

| Mirror Coating: As-Coated | Preferred | Low Range | Upper Range | Lower Limit | Upper Limit | Example |
|---|---|---|---|---|---|---|
| Glass Thickness SCI | 2 | −0.1 | 0.1 | 1.9 | 2.1 | 2 |
| TY (C/2) | .3 | −.2 | .2 | .1 | .5 | .2 |
| L* (C/2) | 2.71 | −1.81 | 1.81 | .9 | 4.52 | 1.83 |
| a* (C/2) | 1 | −1 | 1 | 0 | 2 | .44 |
| b* (C/2) | −4 | −2 | 2 | −6 | −2 | −2.27 |
| RgY (C/2) | 92 | 0 | 8 | 92 | 100 | 95.5 |
| L* (C/2) | 96.82 | 0 | 3.18 | 96.82 | 100 | 98.24 |
| a* (C/2) | 0 | −1 | 1 | −1 | 1 | −.4 |
| b* (C/2) | 3 | −2 | 2 | 1 | 5 | 1.55 |
| RfY (C/2) | 50 | −25 | 25 | 25 | 75 | 28.79 |
| L* (C/2) | 76.07 | −18.99 | 13.32 | 57.08 | 89.39 | 60.90 |
| a* (C/2) | 0 | −6 | 6 | −6 | 6 | 1.92 |
| b* (C/2) | 20 | −20 | 20 | 0 | 40 | 15.83 |
| Sheet resistance | .3 | −.1 | .1 | .2 | .4 | .4 |
| Rg-Vis (555 nm) | >92 | | | 92 | 100 | 94.27 |
| RG-NIR (950 nm) | >92 | | | 92 | 100 | 95.84 |
| R-Solar (ISO 9050) | >92 | | | 92 | 100 | 94.13 |
| Brush (As-coated and Post-HT) | ≤2 at 100 strokes | | | | 2 | 2 |
| 3M Tape Delamination test | No Delamination | | | | | None |
| Thermal Stability (HT) | 650 C.: ≥10 min | | | | 10 | 12 |

It will be appreciated that the FIGS. 1A and 1B examples may include silicon-inclusive layers. Such silicon-inclusive layers may be oxided and/or nitrided in different embodiments of this invention. In addition, or in the alternative, although certain layers are identified as including NiCr, other embodiments may incorporate layers of or including Ni and/or Cr.

Figure 2:
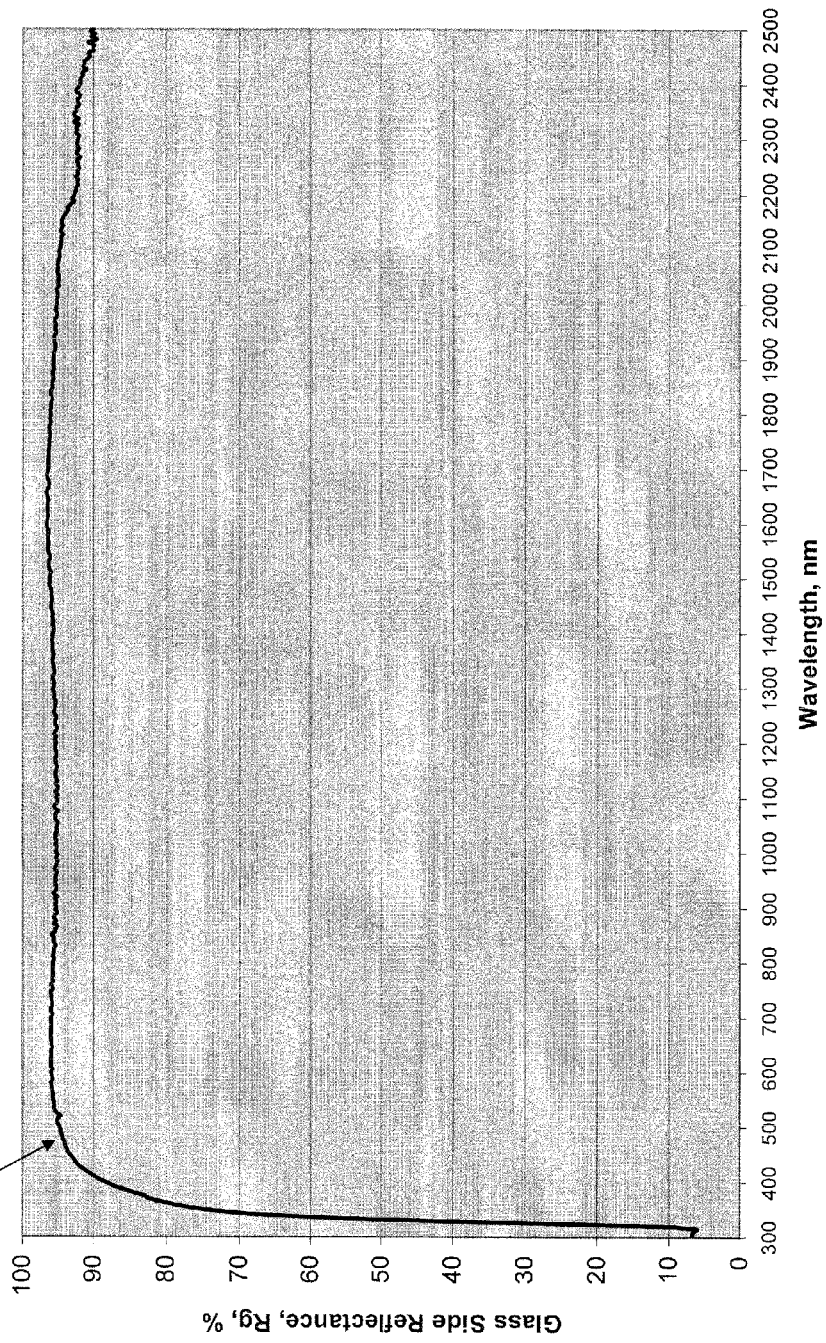
FIG. 2 is a graph showing glass side reflectance versus wavelength according to certain example embodiments.

FIG. 2 is a graph showing glass side reflectance versus wavelength according to certain example embodiments. Line 200 represents glass side reflectance data according to the embodiment shown in FIG. 1A that is corrected to the NIST reference standard over the solar wavelength range. The reflectance data was measured with a Perkin-Elmer double beam spectrophotometer. Solar reflectance was calculated using the ISO 9050 method. Visible glass side reflectance and color was calculated using the Ill. 'C', 2 degree observer. A table showing a summary of the data shown in FIG. 2 is outlined below in Table 2A

TABLE 2A

Summary

| | |
|---|---|
| R-Solar (ISO 9050) | 94.12% |
| RgY (C/2) | 95.50% |
| L* | 98.24% |
| a* | −0.4 |
| B* | 1.55 |

FIG. 3A-3J are example layer stacks according to certain example embodiments. These example layer stacks may be produced via sputter deposition of some or all of the layers at suitable line speeds. The tables below show exemplary thicknesses associated with the respective example embodiments shown in the figures. Techniques other than sputtering also may be used in different embodiments of this invention to provide one or more of the example layers.

FIGS. 1A, 3A, 3B, 3D, 3E

| Layer | Low Range | High Range | Preferred |
|---|---|---|---|
| Undercoat Layer (contacting glass substrate) | 10A | 50A | 40A |
| NiCr Layer | 5A | 15A | 10A |
| Ag Layer | 600A | 800A | 720A |
| NiCr Layer | 100A | 400A | 300A |
| Overcoat Layer of Si3N4 | 100A | 200A | 150A |

FIGS. 3F, 3G, 3H, 3I, 3J

| Layer | Low Range | High Range | Preferred |
|---|---|---|---|
| Undercoat Layer (contacting glass substrate) | 10A | 50A | 40A |
| ZnO Layer | 30A | 50A | 40A |
| Ag Layer | 600A | 800A | 720A |
| NiCr Layer | 100A | 400A | 300A |
| Overcoat Layer of Si3N4 | 100A | 200A | 150A |

Figure 3A:
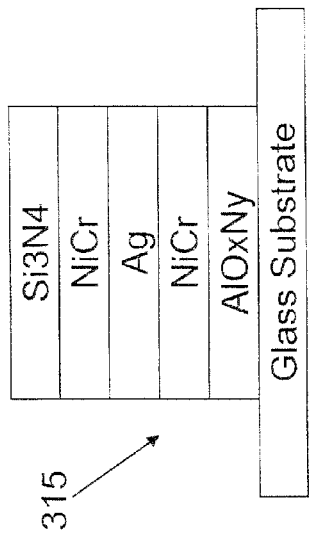
FIGS. 3A-3J are example layer stacks according to certain example embodiments.
Figure 3B:
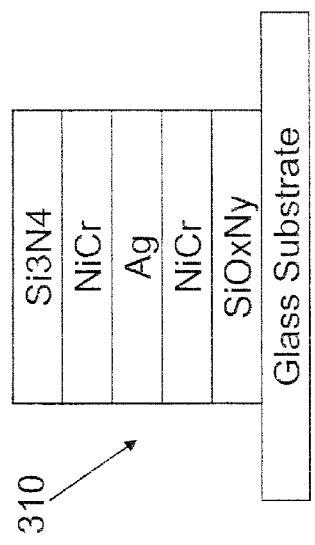
Figure 3C:
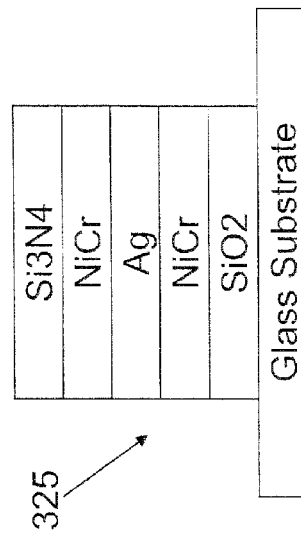
Figure 3D:
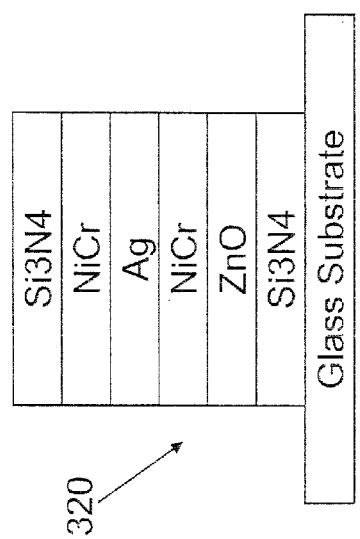
Figure 3F:
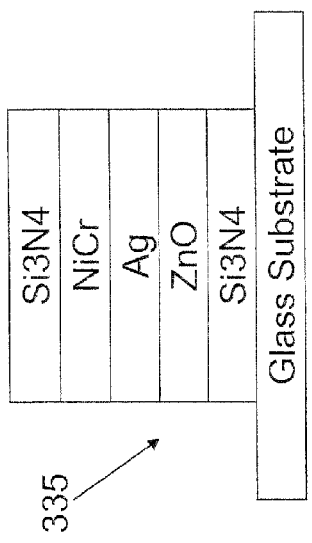
Figure 3H:
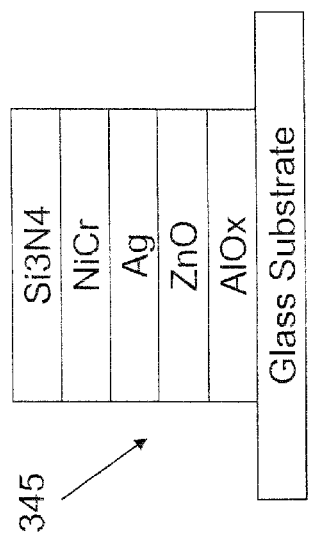
Figure 3E:
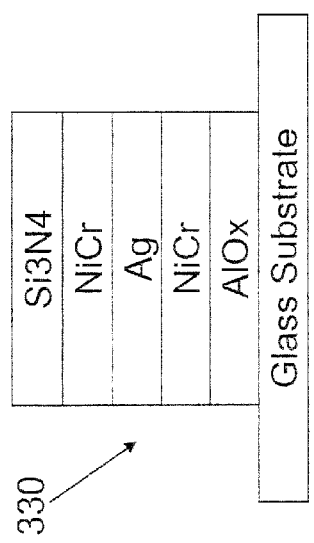
Figure 3G:
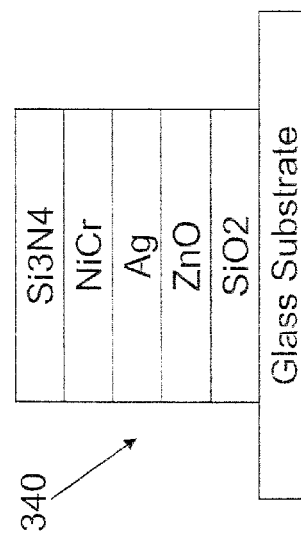
Figure 3I:
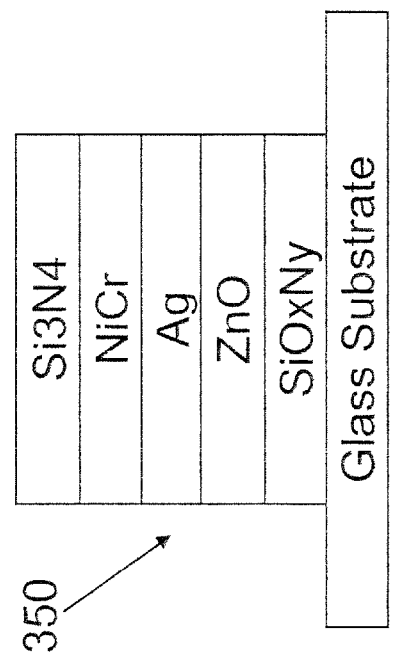
Figure 3J:
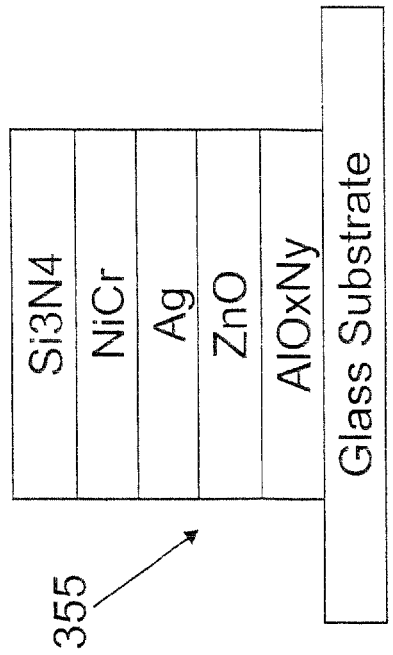

As shown in FIG. 3C, certain example embodiments may have a layer comprising ZnO and a layer comprising Ni and/or Cr disposed between the undercoat layer and the layer comprising Ag. In certain example embodiments, and as shown in FIGS. 3A-3J for instance, a layer closest the substrate may include, for example, an oxide and/or nitride of Si and/or Al.

Figure 4:
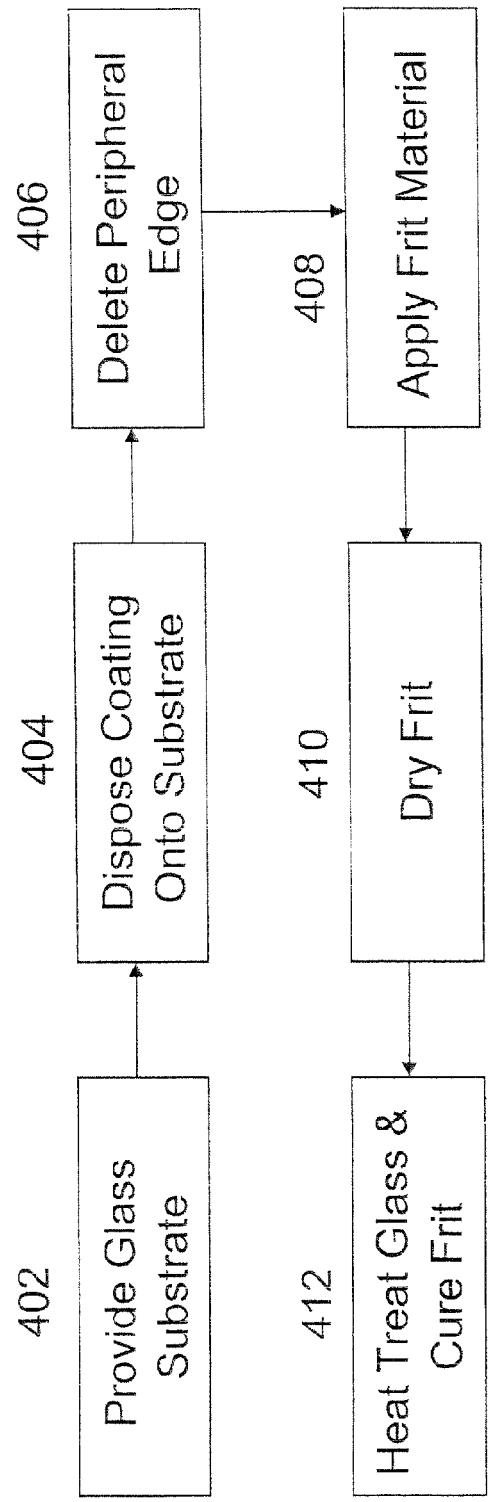
FIG. 4 is an exemplary flowchart illustrating a process for making a reflector according to certain example embodiments.

FIG. 4 is an exemplary flow chart for making a reflector according to certain example embodiments. A glass substrate is provided in step 402. As discussed above, the glass substrate may be a low iron/high transitivity glass substrate. A multi-layer reflective coating may then be disposed (deposited, etc.) onto the glass substrate in step 404. The disposition of the multi-layer reflective coating according to certain example embodiments may be accomplished using a sputtering process or the like. Next, in step 406, a section of the disposed multi-layer reflective coating may be deleted, removed, etc., from the periphery of the glass substrate. The portion of the multi-layer reflective coating may be removed via a mechanical abrasive means, laser etching, etc. In certain example embodiments, the width of the removed area may be between about 1-5 mm depending on the method and application. Thus, the multi-layer reflective coating may be said to be edge deleted such that a portion of the coating is removed at or proximate to the periphery of the substrate.

A frit material may then be disposed (in step 408) over the multi-layer reflective coating and the glass substrate, including the previously deleted peripheral area of the multi-layer reflective coating. In certain example embodiments, the frit may be applied by using a silk screen printing technique, sprayed onto the glass and multi-layer reflective coating, or disposed in some other way. The frit may be of a decorative variety in certain example embodiments. Alternatively, or in addition, the frit may be chosen such that the chemistry of the frit material and its suspension medium may not adversely act with the multi-layer reflective coating (e.g., by consulting the relevant material data sheet (MSDS) for the given material). In certain example embodiments the frit material may have a non-water based carrier system. For example, the frit material may have a pine or other oil base. In certain example embodiments, a frit material such as Johnson Matthey AF3900-601/63 may be used. In certain example embodiments, the type of frit material used may result in fewer pinholes being created in the final fired and cured frit. It will be appreciated that a frit with fewer pin-holes in the finally cured and fired frit may be advantageous.

In certain example embodiments, the coefficient of thermal expansion for a frit as well as its porosity and emissivity may be considered. For example in certain example embodiments the coefficient of thermal expansion (CTE) for the frit material may be within about 15% of the CTE for the glass substrate onto which the frit material is disposed. More preferred the CTE may be within about 10%, and even more preferred the CTE of the frit and the glass substrate may be within about 5% of each other. The disposed fit may form a hermetic or near-hermetic seal over the multi-layer reflective coating.

The frit material may then be dried to flash off solvents in step 410. Next in step 412, the glass substrate, multi-layer reflective coating, and the frit material may be heat treated such that the first is fired or cured as the heat treatment reaches the firing temperature. Further, during the heat treatment the reflector (e.g., the glass substrate) is formed, bent, etc., into a desired shape for SRP or other applications (e.g., to achieve a fit into an assembly and maintain accurate focus of energy onto a collector tube). In certain example embodiments, the coated article may be left flat for the desired end application. In certain example embodiments, heat treatment may be in a range of 600-650 degrees C. and may result in the frit becoming a durable protective layer fused to at least the top layers of the above applied multi-layer reflective coating. Although certain example embodiments relate to SRP applications, the example techniques described herein may be used in connection with other coated articles to be used in mirror/reflector applications. For instance, the example techniques described herein may be used in connection with primary reflectors in parabolic trough, parabolic dish, or other bent or flat arrangements.

The above steps in fabricating a reflector may be altered according to certain example embodiments. For example, drying the frit in step 410 may be excluded from the process. In other example embodiments, the deletion of the peripheral edge may be omitted. In certain example embodiments, a mask may be placed onto the glass substrate such that the mask covers the outer periphery and thus disposition of the multi-layer reflective coating onto the glass substrate may only apply at the area not covered by the mask.

In certain example embodiments, a temperature resistant paint may be applied in addition to, or as an alternative to, the above frit material. For example, an alumized high temperature resistant paint such as Aremco Corr-Paint CP 4010S may be used. According to certain example embodiments, when paint is used instead of a frit material, the glass substrate with a multi-layer reflective coating may be hot formed at 600-650 degrees C. into an appropriate shape. Next, a high temperature coating may be applied to the coated surface using, for example, a spray system or curtain coater. It will be appreciated that high temperature resistant paints may be resistant to operating temperatures in SRP and/or CSP applications. However, such paints may not be resistant to the bending temperature of the glass substrate. Accordingly, in certain example embodiments, the temperature resistant paint may be applied after the glass substrate with a multi-layer reflective coating has been hot formed. After formation, the paint may be applied and then cured following recommended curing cycles based on manufacturer specification. For example, curing may be accomplished in the range of approximately 200-350 degrees C.

In certain example embodiments, the assembly may help to protect the mirror coating layers from long term exposure to humidity and other elements that may cause corrosion and/or eventual breakdown of reflective performance of the coating and the system.

Figure 5:
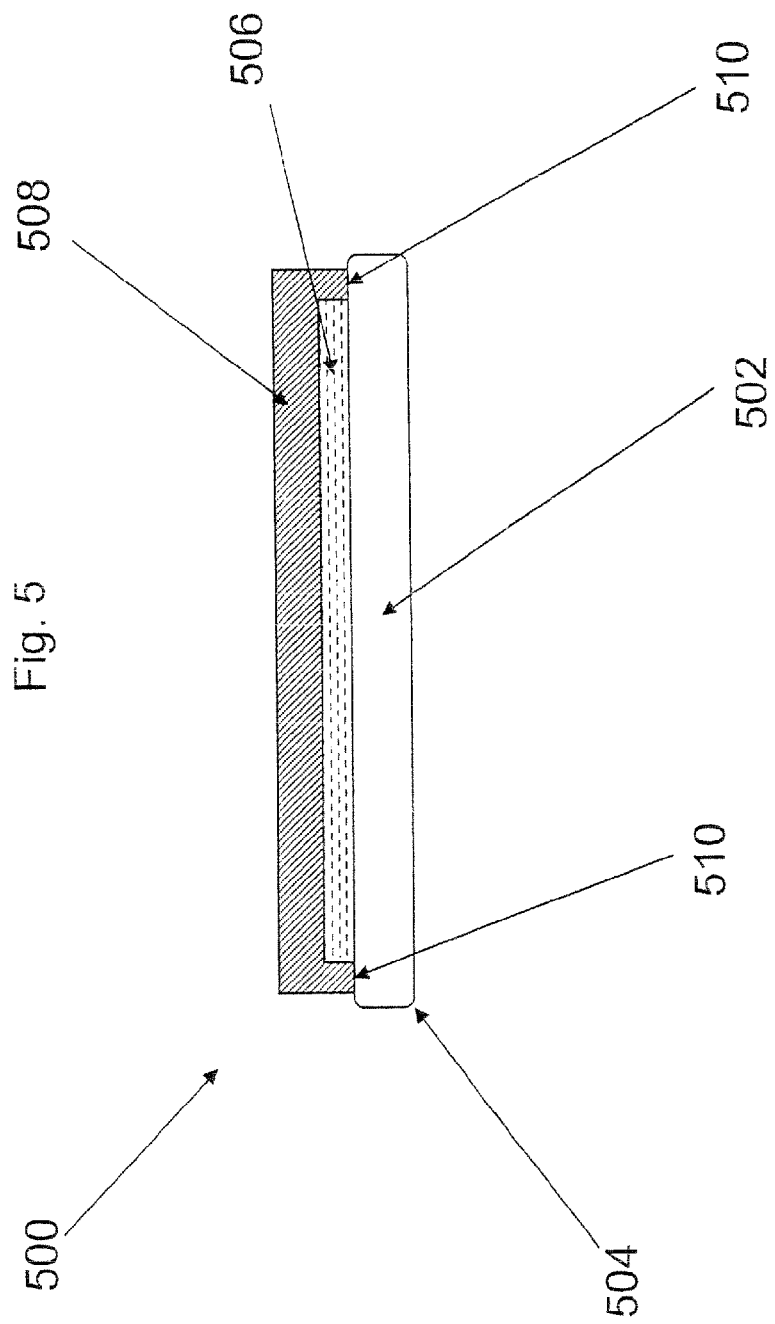
FIG. 5 is an example cross-sectional view of a reflector according to certain example embodiments.

FIG. 5 is an example cross sectional view of a reflector according to certain example embodiments. A reflector 500 may be fabricated using the above described technique shown in FIG. 4. Glass substrate 502 may be constructed such that edges 504 have a finished structure (e.g., rounded). Disposed onto the glass substrate 502 may be a layer stack 406 such as, for example, one of the layer stacks discussed above (e.g., FIG. 1A). The coated layer stack 506 may have portions 510 that are removed, deleted, etc., from the periphery of the glass substrate 502. A frit 508 may then be disposed over the coated layer stack 506 such that the coated layer stack 506 may be hermetically or substantially hermetically sealed by the glass substrate 502 and the frit 508. As discussed above, in certain example embodiments, temperature resistant paint may be applied instead of the frit 508.

Figure 6:
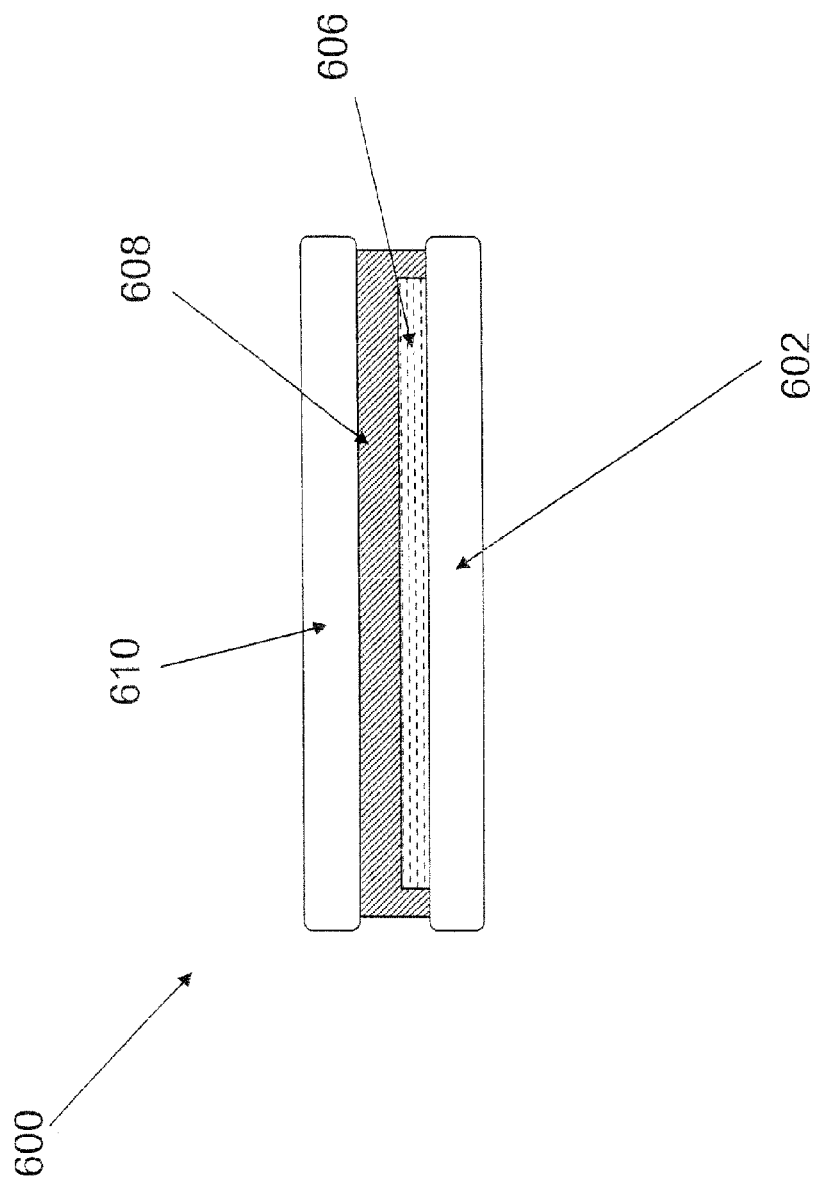
FIG. 6 is a second example cross-sectional view of a reflector according to certain example embodiments.

FIG. 6 is a second example cross sectional view of a reflector according to certain example embodiments. In this embodiment, a reflector 600 includes a sheet of backing glass 610 that is adhered to the multi-layer reflective coating 606 and the glass substrate 602 by a high temperature adhesive/coating material 608. The back glass 610 may be a piece of typical soda lime float glass having similar mechanical properties as the front glass substrate 602. However, the back glass 610 may not be of the same low-iron/high transmissivity glass used for glass substrate 602. The back glass 610 may be similarly bent or formed via heat treatment as the glass substrate 602 and its multi-layer reflective coating 606.

The back glass 610 may have a thickness ranging from about 1.6-3.0 mm depending, for example, on the desired final mechanical strength of the reflector 600. In certain example embodiments, having the geometry of the back glass 620 closely match the glass substrate 602 may facilitate the joining of the two substrates with a high temperature adhesive 608. The high temperature adhesive 608 may help to hermetically seal (or near hermetically seal) the mirror coating between the two glass substrates. For example, the alumized coating discussed above may be used as a high temperature adhesive 608. In certain example embodiments, the high temperature adhesive may be applied after forming the glass substrates to their desired shapes. Further, the adhesive may be applied to the inside surface of the backing glass 610, the multi-layer reflective coating 606, and the deleted surface area on the glass substrate 602. In certain example embodiments, the adhesive may be dried before assembly of the two glass substrates to flash off solvents so that the solvents may not be trapped in the assembly. It will be appreciated that this may help prevent the creation of gas pockets within the reflector 600 during the curing process. The two glass substrates may then be assembled and cured using a combination of heat and mechanical and/or pneumatic pressure resulting in a final sealed reflector 600.

FIG. 7 is a third example cross sectional view of a reflector according to certain example embodiments. A reflector 700 is shown with an encapsulated multi-layer reflective coating 706. A back glass substrate 710 is adhered to a glass substrate 702 with beads of frit material 712.

As discussed above glass substrate 702 may be a low iron type of glass. The glass substrates 702 and 710 may be formed with heat to an appropriate shape of the desired reflector. A bead 712 of a low firing temperature frit material having the consistency of a paste may then be disposed around the entire perimeter of the coated side of the glass substrate 702 and the inside surface of the glass substrate 710 such that the bead may substantially directly align when the substrates are assembled.

The disposed bead 712 may be about 6-10 mm wide in certain example embodiments. When wet, the frit bead may have a thickness of approximately 0.5-1.5 mm. As shown in FIG. 7, the bead 712 may be disposed such that it overlaps the coated and edge deleted surface on the glass substrate 702. Accordingly, the multi-layer reflective coating 706 may be sealed (hermetically or near-hermetically). Both glass substrates 702 and 710 may be placed together having a central air gap 714 created by the height of the frit beads 712.

The then-combined substrates with the multi-layer reflective coating 706 disposed therebetween may be processed through a firing and annealing cycle supported on a tool having the desired final shape of the reflector. As the glass substrates may be pre-bent, there may not be a net force from the glass substrates to resist taking on the desired shape. Further, as the fit bead 712 is formulated to fire at lower temperatures (typically 420-480 degrees C.) than the glass bending process (e.g., 650 degrees C.), the glass substrates may not reach a temperature at which they may permanently alter. As such, during the firing process, the glass frit may soften, flow, and fuse resulting in a final gap between the glass plies of about 0.2-1.0 mm with a nearly or fully sealed perimeter. In certain example embodiments, depending on the specific shape design, some mechanical pressing may be used while the frit bead 712 is hot to force compression of the frit around the periphery of the glass substrates. After fusion, the reflector 700 may then be slow cooled to allow relaxation of stresses in the fused reflector 700. Although the example embodiments shown in connection with FIGS. 5-7 are flat, it will be appreciated that they may be hot or cold bent in different implementations, e.g., for different desired end applications. For example, flat, hot-bent, or cold-bent heat treatable coated articles may be used in connection with SRP, primary reflector, or other mirror/reflector applications. Furthermore, it will be appreciated that the same or different techniques may be used to produce primary and/or secondary reflectors in one or more systems.

The example techniques of one or more of U.S. Publication Nos. 2007/0223121, 2007/0221313, 2007/0291384, and/or 2009/0101208, and/or U.S. Pat. No. 7,871,664 may be used in connection with different embodiments of this invention. For instance, the coated articles described herein may be cold- or hot-bent into parabolic (e.g., parabolic trough shapes), with stiffening members added, with backing plates added, etc. In terms of cold bending, for example, it sometimes may be advantageous that the reflective coating be formed (e.g., via sputtering or the like) on the glass when the glass is in a flat form, e.g., as shown in FIGS. 3A-3J. This may in certain instances permit the coating to be formed in a more consistent and uniform manner, thereby improving the reflective characteristics thereof so that the final product may achieve improved optical performance (e.g., better and/or more consistent reflection of visible and/or IR radiation).

For instance, once the reflective coating has been formed on the flat glass substrate to form a coated article, the flat coated article may be positioned over a mold. The mold 12 may be in the shape of a parabola or the like, to which it is desired to bend the coated article. Moreover, the mold may have a plurality of holes defined therein for drawing a vacuum to help bend the coated article. The coated article including the glass and reflective coating may be positioned over and lowered onto the surface of the mold. The coated article, including the glass and coating thereon, may then be cold-bent along the parabolic surface of the mold. The cold-bending may be achieved via a gravity sag on the parabolic surface of the mold, with the optional help of a vacuum system that helps draw the coated article toward the parabolic mold surface. In certain example embodiments, the glass may directly contact the parabolic bend surface of the mold during the bending process.

The bending of the coated glass article may be a cold-bend technique, because the glass is not heated to its typical bending temperature(s) of at least about 580 degrees C. Instead, during the bending, the glass substrate with the coating thereon may be bent while at a temperature of no more than about 200 degrees C., more preferably no more than about 150 degrees C., more preferably no more than about 100 degrees C., even more preferably no more than about 75 degrees C., still more preferably no more than about 50 degrees C., still more preferably no more than about 40 or 30 degrees C., and possibly at about room temperature in certain example instances. In order to not exceed the maximum tensile stress (e.g., 20.7 to 24.15 MPa) that would lead to spontaneous breakage of the glass during cold bending in this configuration, the thickness of glass substrate may be kept relatively thin. For example, the glass may be from about 0.5 to 2.5 mm thick, sometimes from about 1.0 to 2.25 mm thick, and sometimes even from about 1.0 to 2.0 mm thick.

After the coated article including the and coating has been cold-bent to its desired shape (e.g., parabolic shape), this bent shape may be maintained using a plate/frame such as another glass sheet or a thermoplastic on which the coated article may be glued or otherwise adhered. Optionally, addition of an adequate adhesive agent, or an adhesive/laminating layer may be used to caused excellent adhesion between the coated article and the plate. The plate may be transparent or opaque in different embodiments. The plate may or may not be pre-bent in a shape corresponding to the cold-bent substrate in different example embodiments. The plate may be attached to the cold-bent glass (and thus to the reflective coating thereon) via an adhesive/laminating layer and/or via fasteners in different example embodiments, e.g., in order to help freeze its bent shape around the exterior of the coated article made up of the cold-bent glass and the reflective coating. The cold-bent article may then be removed from the mold. The bent/shaped plate then maintains the bent shape of the cold-bent glass to which it is adhered and/or fastened, thereby keeping the glass and coating thereon in a desired bent shape/form.

Although certain example embodiments have been described as including breaker materials of or including Ni and/or Cr, other example embodiments may use other materials and/or alloys. Such materials may include, for example, NiCr of any suitable ration (e.g., 50/50, 80/20, 90/10), CoCr, NiAg, NiCu (e.g., under the trade name Monel), NiTi, Cu, CuAl (e.g., under the trade name ampco), Ag/Cu alloys (e.g., having a 90/10 or other suitable ratio), etc. Thus, in general, it will be appreciated that breaker materials of certain example embodiments may be of or include Ni and/or Cr and/or Cu, although other materials also are possible.

Although certain example embodiments have been described in connection with secondary reflector panels (SRPs), it will be appreciated that the example techniques described herein may be applied to other types of mirrors/reflectors. For instance, in the context of concentrating solar power (CSP) applications, the techniques described herein may be used in connection with primary reflectors, secondary reflectors, and/or the like. The heat treatable coated articles described herein also may be hot- or cold-bent into a desired shape, e.g., suitable for a desired application. For example, hot or cold bending techniques may be used to create a shape suitable for use in a parabolic reflector, a parabolic trough arrangement, etc. In certain example embodiments, however, the heat treatable coated articles may be left substantially flat or planar.

The terms "peripheral" and "edge" as used herein do not necessarily mean locations at the absolute periphery or edge of a substrate, but instead refer to a location that is at or near (e.g., within about a few inches) of an edge of at least one substrate.

It will be appreciated that the stoichiometries recited herein are given by way of example only. Other stoichiometries than those recited herein may apply in certain example embodiments (e.g., silicon nitride may be provided as $Si_3N_4$ or according to any other suitable stoichiometry). In addition, in certain example embodiments the layer(s) of Ni and/or Cr may be oxided. Similarly, silicon-inclusive layers may be fully or partially oxided and/or nitrided, e.g., to fully stoichiometric or sub-stoichiometric layers.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

While the invention has been described in connection with what is presently considered to be the most practical and preferred embodiment, it is to be understood that the invention is not to be limited to the disclosed embodiment(s), but on the contrary, is intended to cover various modifications and equivalent arrangements.

What is claimed is:

1. A method of making a heat treatable coated article, the method comprising:
   disposing a reflective multi-layer coating on all or substantially all of a major surface of a substrate;

removing a portion of the reflective multi-layer coating proximate to an edge of the substrate;

following said removing, disposing a frit material over the substrate including over at least part of the reflective multi-layer coating that remains disposed on the substrate; and heating the substrate, as well as the reflective multi-layer coating and the fit material disposed on the substrate, to an elevated temperature so as to cure the frit material, wherein visible transmission through the heat treatable coated article is no more than 7%.

2. The method of claim 1, wherein the substrate is a glass substrate, and further comprising cold bending the glass substrate with the reflective multi-layer and the frit material disposed thereon into a desired shape.

3. The method of claim 1, wherein the frit material is about 20-50 microns thick.

* * * * *